(12) United States Patent
Lee et al.

(10) Patent No.: US 10,466,831 B2
(45) Date of Patent: Nov. 5, 2019

(54) TOUCH DISPLAY DEVICE (71) Applicant: Samsung Display Co., Ltd., Yongin, Gyeonggi-Do (KR)

(72) Inventors: Gi Chang Lee, Asan-si (KR); In Soo Wang, Asan-si (KR); Hyun Woo Cho, Seongnam-si (KR)

(73) Assignee: Samsung Display Co., Ltd. (KR)

( * ) Notice: Subject to any disclaimer, the term of this patent is extended or adjusted under 35 U.S.C. 154(b) by 383 days.

(21) Appl. No.: 14/850,597

(22) Filed: Sep. 10, 2015

(65) Prior Publication Data

US 2016/0246433 A1 Aug. 25, 2016

(30) Foreign Application Priority Data

Feb. 24, 2015 (KR) .......................... 10-2015-0026023

(51) Int. Cl.
| | |
|---|---|
| *G06F 3/041* | (2006.01) |
| *G06F 3/044* | (2006.01) |
| *G09G 3/36* | (2006.01) |
| *G09G 3/3225* | (2016.01) |

(52) U.S. Cl.
CPC ............ *G06F 3/0416* (2013.01); *G06F 3/044* (2013.01); *G06F 3/0412* (2013.01); *G09G 3/3225* (2013.01); *G09G 3/3659* (2013.01); *G06F 2203/04111* (2013.01); *G09G 2300/0819* (2013.01)

(58) Field of Classification Search
CPC ...... G06F 3/0416; G06F 3/044; G06F 3/0412; G06F 2203/04111; G06F 3/041–044; G09G 3/3659; G09G 3/3225; G09G 2300/0819
See application file for complete search history.

(56) References Cited

U.S. PATENT DOCUMENTS

| | | | | |
|---|---|---|---|---|
| 2011/0025637 | A1* | 2/2011 | Yi ......................... | G06F 3/0412 345/173 |
| 2011/0273397 | A1* | 11/2011 | Hanari .................. | G06F 3/0412 345/174 |
| 2012/0249401 | A1* | 10/2012 | Omoto .................. | G06F 3/0412 345/80 |
| 2013/0321292 | A1* | 12/2013 | Jeon ...................... | G06F 3/0412 345/173 |

(Continued)

FOREIGN PATENT DOCUMENTS

| | | |
|---|---|---|
| KR | 10-2009-0108483 | 10/2009 |
| KR | 10-2011-0068148 | 6/2011 |

(Continued)

*Primary Examiner* — Temesghen Ghebretinsae
*Assistant Examiner* — Ivelisse Martinez Quiles
(74) *Attorney, Agent, or Firm* — Innovation Counsel LLP (57) ABSTRACT A touch display device according to an exemplary embodiment of the present inventive concept includes: a plurality of pixel circuits; a plurality of first signal lines respectively connected to the plurality of pixel circuits and extending in a first direction; and a plurality of second signal lines respectively connected to the plurality of pixel circuits and extending in a second direction, wherein at least one signal line among the plurality of first signal lines and the plurality of second signal lines function as a first sensing electrode and a second sensing electrode in the touch mode, respectively.

8 Claims, 5 Drawing Sheets (56) References Cited

U.S. PATENT DOCUMENTS

| | | | | |
|---|---|---|---|---|
| 2014/0062915 A1* | 3/2014 | Kim | ................... | G06F 3/0416 |
| | | | | 345/173 |
| 2014/0146246 A1* | 5/2014 | Ma | ................... | G06F 3/0412 |
| | | | | 349/12 |
| 2014/0198067 A1* | 7/2014 | Jeon | ................... | G06F 3/0412 |
| | | | | 345/173 |
| 2014/0210736 A1* | 7/2014 | Jeon | ................... | G06F 3/0412 |
| | | | | 345/173 |
| 2015/0221255 A1* | 8/2015 | Qing | ................... | G06F 3/0412 |
| | | | | 345/173 |
| 2015/0346860 A1* | 12/2015 | Qin | ................... | G06F 3/0412 |
| | | | | 345/174 |
| 2016/0041438 A1* | 2/2016 | Hu | ................... | G06F 3/0412 |
| | | | | 345/174 |
| 2016/0041664 A1* | 2/2016 | Qin | ................... | G06F 3/044 |
| | | | | 345/173 |
| 2016/0187696 A1* | 6/2016 | Kim | ................... | G06F 3/0412 |
| | | | | 349/12 |
| 2016/0202815 A1* | 7/2016 | Zheng | ................... | G06F 3/044 |
| | | | | 345/174 |
| 2016/0204166 A1* | 7/2016 | Yang | ................... | G06F 3/044 |
| | | | | 345/173 |
| 2018/0233087 A1* | 8/2018 | Hu | ................... | G09G 3/3233 |

FOREIGN PATENT DOCUMENTS

| | | |
|---|---|---|
| KR | 10-1084236 | 11/2011 |
| KR | 10-1362389 | 2/2014 |

* cited by examiner

TOUCH DISPLAY DEVICE

CROSS-REFERENCE TO RELATED APPLICATION

This application claims priority to and the benefit of Korean Patent Application No. 10-2015-0026023 filed in the Korean Intellectual Property Office on Feb. 24, 2015, the entire contents of which are incorporated herein by reference.

BACKGROUND (a) Field

The present inventive concept relates to a touch display device, and in detail, relates to an in-cell type of touch display device.

(b) Description of the Related Art

A technique for providing a touch function to a display device according to market demand is essential. This display device is referred to as a touch display device.

The touch display device may be manufactured by combining a separate touch screen panel to a display panel, or may be manufactured into an on-cell type or an in-cell type by integrally forming a sensing electrode in the display panel.

When manufacturing the in-cell type of touch display device, a plurality of sensing electrodes are formed to be close to the pixel circuit, and touch wiring to transmit a signal to the plurality of sensing electrodes is installed.

However, a region of forming the wirings such as a data line, a gate line and an initialization voltage supply line, etc. of a conventional pixel circuit is limited.

Also, when forming the touch wiring in another metal layer that is not the same metal layer as the wiring of the conventional pixel circuit, there is a drawback of requiring a separate mask in the manufacturing process.

So as to reduce a cost and manufacturing time, it is necessary to manufacture the in-cell type of touch display device without using the new mask.

The above information disclosed in this Background section is only for enhancement of understanding of the background of the inventive concept and therefore it may contain information that does not form the prior art.

SUMMARY

The present inventive concept provides an in-cell type of touch display device manufactured without adding a photolithographic process.

A touch display device according to an exemplary embodiment of the present inventive concept includes: a plurality of pixel circuits; a plurality of first signal lines respectively connected to the plurality of pixel circuits and extending in a first direction; and a plurality of second signal lines respectively connected to the plurality of pixel circuits and extending in a second direction, wherein at least one signal line among the plurality of first signal lines and the plurality of second signal lines function as a first sensing electrode and a second sensing electrode in the touch mode, respectively.

The plurality of first signal lines may be initialization voltage supply lines, the plurality of second signal lines may be readout wiring, at least one signal line among the plurality of first signal lines may function as transmit electrodes in a touch mode, and at least one signal lines among the plurality of second signal lines may function as receive electrodes in the touch mode.

The touch display device may be driven with time division mode which includes a display mode, a readout mode and a touch mode, the plurality of first signal lines may supply an initialization voltage in the display mode, the plurality of second signal lines may receive a voltage of at least one node of the pixel circuit in the readout mode respectively, at least one signal line among the plurality of first signal lines may supply a touch driving signal in the touch mode, and at least one signal line among the plurality of second signal lines may receive a touch detecting signal.

The plurality of first signal lines may be grouped in a predetermined number to form peripheral wiring.

The plurality of first signal lines may be initialization voltage supply lines, the plurality of second signal lines may be data lines, at least one signal line among the plurality of first signal lines may function as transmit electrodes in the touch mode, and at least one signal line among the plurality of second signal lines may function as receive electrodes in the touch mode.

The touch display device may be driven with the time division mode which includes the display mode and the touch mode, the plurality of first signal lines may supply an initialization voltage in the display mode, the plurality of second signal lines may supply the data voltage in the display mode, at least one signal line among the plurality of first signal lines may supply a touch driving signal in the touch mode, and at least one signal line among the plurality of second signal lines may receive a touch detecting signal.

A touch display device according to an exemplary embodiment of the present inventive concept includes: a plurality of pixel circuits, the pixel circuits including a gate line and a data line crossing the gate line, a plurality of first signal lines respectively connected to the plurality of pixel circuits and substantially extending in a first direction, and a plurality of second signal lines respectively connected to the plurality of pixel circuits and extending in a second direction; and a plurality of second sensing electrode expansion disposed between adjacent first signal lines.

The plurality of second sensing electrode expansion may be connected to the second signal lines, respectively.

The plurality of second sensing electrode expansion and the plurality of first signal lines may be formed of a same material through a same process.

The plurality of second sensing electrode expansion may be formed in a region corresponding to green pixels, respectively.

The plurality of first signal lines may be initialization voltage supply lines and the plurality of second signal lines may be readout wirings.

At least one of the plurality of pixel circuits may include an organic light emitting element, the organic light emitting element includes a first electrode, a second electrode and an organic emission layer disposed between the first electrode and the second electrode. The first electrode and the second sensing electrode expansion may be formed of a same material through a same process.

According to an exemplary embodiment of the present inventive concept, the in-cell type of touch display device manufactured without an additional photolithographic process may be provided.

DETAILED DESCRIPTION OF THE EMBODIMENTS

The present inventive concept will be described more fully hereinafter with reference to the accompanying drawings, in which exemplary embodiments of the inventive concept are shown. As those skilled in the art would realize, the described embodiments may be modified in various different ways, all without departing from the spirit or scope of the present inventive concept.

In the drawings, the thickness of layers, films, panels, regions, etc., are exaggerated for clarity. Like reference numerals designate like elements throughout the specification. It will be understood that when an element such as a layer, film, region, or substrate is referred to as being "on" another element, it can be directly on the other element or intervening elements may also be present between the element and the another element. In contrast, when an element is referred to as being "directly on" another element, there are no intervening elements present.

Figure 1:
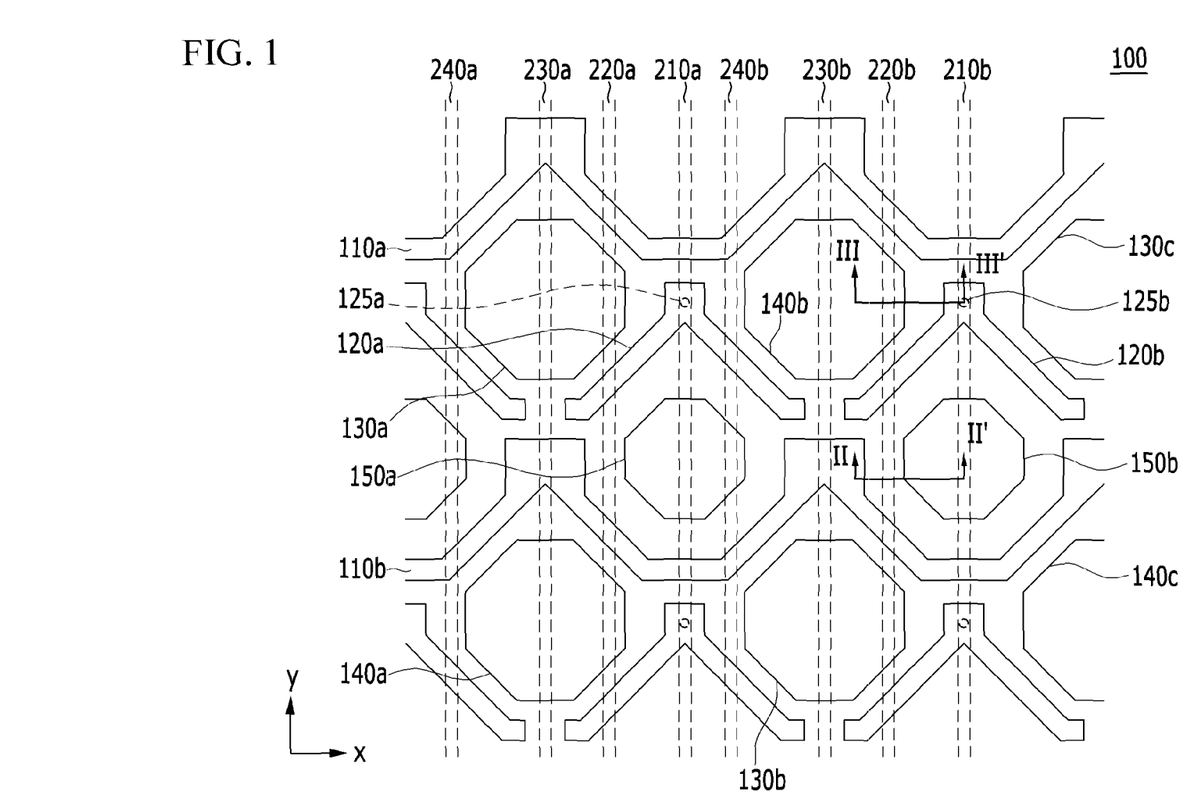
FIG. 1 is a view showing a pattern of a first metal layer according to an exemplary embodiment of the present inventive concept.

FIG. 1 is a view showing a pattern of a first metal layer according to an exemplary embodiment of the present inventive concept.

Referring to FIG. 1, a first metal layer 100 according to an exemplary embodiment of the present inventive concept is patterned with first electrodes 130a, 130b, 130c, 140a, 140b, 140c, 150a, and 150b, first signal lines 110a and 110b, and second sensing electrode expansions 120a and 120b of each organic light emitting element.

The first metal layer may be simultaneously patterned into the above-described three patterns through a photolithography process using one mask after deposition of a first metal forming layer. In this case, a separate mask for patterning each constitution is not necessary such that a manufacturing cost may be reduced.

In FIG. 1, indicated by dotted lines are second signal lines 210a, 210b, 230a, and 230b and data lines 220a, 220b, 240a, and 240b patterned in a second metal layer that is different from the first metal layer.

Only part of the constituent elements and the arrangement of the first metal layer 100 and the second metal layer are shown in FIG. 1 for clarity of comparison.

That is, for example, the data line 220b is formed of a shape that extends in a second direction y, however it may be simultaneously formed in one body with a source terminal of a switching transistor T2 (referring to FIG. 4) of each pixel circuit. Also, a source terminal and a drain terminal of other transistors T1, T3, T4, T5, T6, T7, and T8 may be patterned together.

Accordingly, in FIG. 1, the second signal lines 210a, 210b, 230a, and 230b and the data lines 220a, 220b, 240a, and 240b exemplarily extend in the second direction y, however it is clear that various shapes may be formed depending on the patterning of the second metal layer to a person of ordinary skill in the art.

The first signal lines 110a and 110b generally extend in the first direction x and are connected to the pixel circuit.

Also, the second signal lines 210a, 210b, 230a, and 230b generally extend in the second direction y and are connected to the pixel circuit.

At least some signal lines 110a and 110b among the first signal lines 110a and 110b function as a first sensing electrode in a touch mode, and at least some signal lines 210a and 210b among the second signal lines 210a, 210b, 230a, and 230b function as a second sensing electrode in the touch mode.

The touch display device of the present inventive concept may be driven by time-division mode in which a display mode, a readout mode, and a touch mode are included. The display mode is a mode to display the image to a user as a display device, the readout mode is a mode receiving a voltage of some nodes of the pixel circuit through a readout line to confirm degradation of an element and a distribution degree, and the touch mode is a mode to sense where the touch of the user is generated in the display area.

In generally, each mode is driven with the time division mode for noise attenuation. For example, when the display mode and the touch mode are simultaneously performed, a fluctuation in touch signal is generated by a parasitic capacitance depending on the level of the data voltage, and thereby touch error detection is easily generated.

Also, in contrast, when the touch driving signal of a high voltage is applied to the touch panel, the display element (a common electrode of an LCD, a cathode of an OLED, etc.) connected through the parasitic capacitance is affected such that a moiré effect is generated and adversely affects the display quality.

Also, the readout mode is to measure an emission characteristic depending on the degradation or the distribution of the organic light emitting element of the organic light emitting display. The readout node may be implemented by various methods, however a white gray voltage as a data voltage is generally applied and a current or a voltage according thereto is measured. Accordingly, the display mode and the readout mode may be incompatible. Even if the display mode and the readout mode are compatible, a separate element is required for proper operation of the display mode and the readout mode, which results in an increase in manufacturing cost.

Accordingly, in the present inventive concept, the display mode, the touch mode, and the readout mode may be incompatible, and it will be described that they are driven with the time division manner.

However, the sequence and the time period of the display mode, the touch mode, and the readout mode may be changed depending on the kind of the manufactured display.

Each mode may be interposed between the other modes.

The touch method may be varied depending on the kind of the manufactured panel. The capacitance sensing method described in the present inventive concept may be classified into a mutual-capacitive type and a self-capacitive type.

Next, the mutual capacitance sensing method will be described, however the sensing method may be a self-capacitance type which does not have a transmit electrode (Tx electrode) and a receive electrode (Rx electrode) but the independent wirings are connected to sensing electrodes to detect sensing events.

The first signal lines 110a and 110b may function as the Tx electrode in the touch mode. A touch driving signal may be supplied in the touch mode in an integrated circuit (IC) connected to the first signal lines 110a and 110b.

In general, a resolution of the touch electrode to sense the finger touch may be designed to be lower than the resolution of the pixel. That is, in the drawing, it is not necessary for all first signal lines 110a and 110b to function as the Tx electrode. The odd-numbered first signal lines 110a may functions as the Tx electrodes, and the even-numbered first signal lines 110b may not function as the Tx electrodes. Also, as will be described later in FIG. 5, the first signal lines 110a and 110b may be grouped to be used as one Tx electrode.

Like the case of the Tx electrode, it is not necessary for the second signal lines 210a, 210b, 230a, and 230b to all function as the Rx electrode. Accordingly, in the present exemplary embodiment, it will be described that the second signal lines 230a and 230b do not perform the function of the Rx electrode and only the second signal lines 210a and 210b perform the function of the Rx electrode. As another method, the second signal lines 210a, 210b, 230a, and 230b may be grouped to be used as the Rx electrode.

It is difficult for the second signal lines 210a and 210b alone to form sufficient mutual capacitance with the first signal lines 110a and 110b. Accordingly, in the present inventive concept, the second sensing electrode expansions 120a and 120b are formed in the first metal layer 100, and the second sensing electrode expansions 120a and 120b and the first signal lines 110a and 110b form the mutual capacitance.

The second sensing electrode expansions 120a and 120b are connected to the second signal lines 210a and 210b through via holes 125a and 125b. In this case, the via holes are patterned together when patterning a first insulating layer 1800 such that the separate mask is not necessary. This will be described later in FIGS. 2 and 3.

FIG. 1 shows the pixel arrangement of a pentile structure as an example, the first electrodes 130a, 130b, and 130c correspond to a red pixel, wherein the first electrodes 140a, 140b, and 140c correspond to a blue pixel, and the first electrodes 150a and 150b correspond to a green pixel.

It is apparent that the color of each pixel may be differently determined. In the present inventive concept, a method of displaying the image to the user based on a combination of three primary colors will be described, however the image may be displayed through other pixel arrangement such as RGBW. That is, the present inventive concept is not limited to the pentile structure.

The size of the pixel may be designed to be large if the life of the organic light emitting material is short, or to be small if the life of the organic light emitting material is long. In general, the life of the blue organic light emitting material is shortest, and the life of the green organic light emitting material is longest.

Accordingly, in FIG. 1, the size of the first electrodes 150a and 150b corresponding to the green pixel is smaller than that of the first electrodes 130a, 130b, 130c, 140a, 140b, and 140c such that the region for forming the second sensing electrode expansions 120a and 120b may be secured, and the second sensing electrode expansions 120a and 120b are patterned in the secured region.

As another exemplary embodiment, although each size of the first electrodes 130a, 130b, 130c, 140a, 140b, 140c, 150a, and 150b is the same, by reducing each size of the first electrodes with the same ratio, the region of the second sensing electrode expansions 120a and 120b may also be secured.

Next, cross-sections taken along the lines II-II' and III-III' of FIG. 1 will be described in FIGS. 2 and 3.

Figure 2:
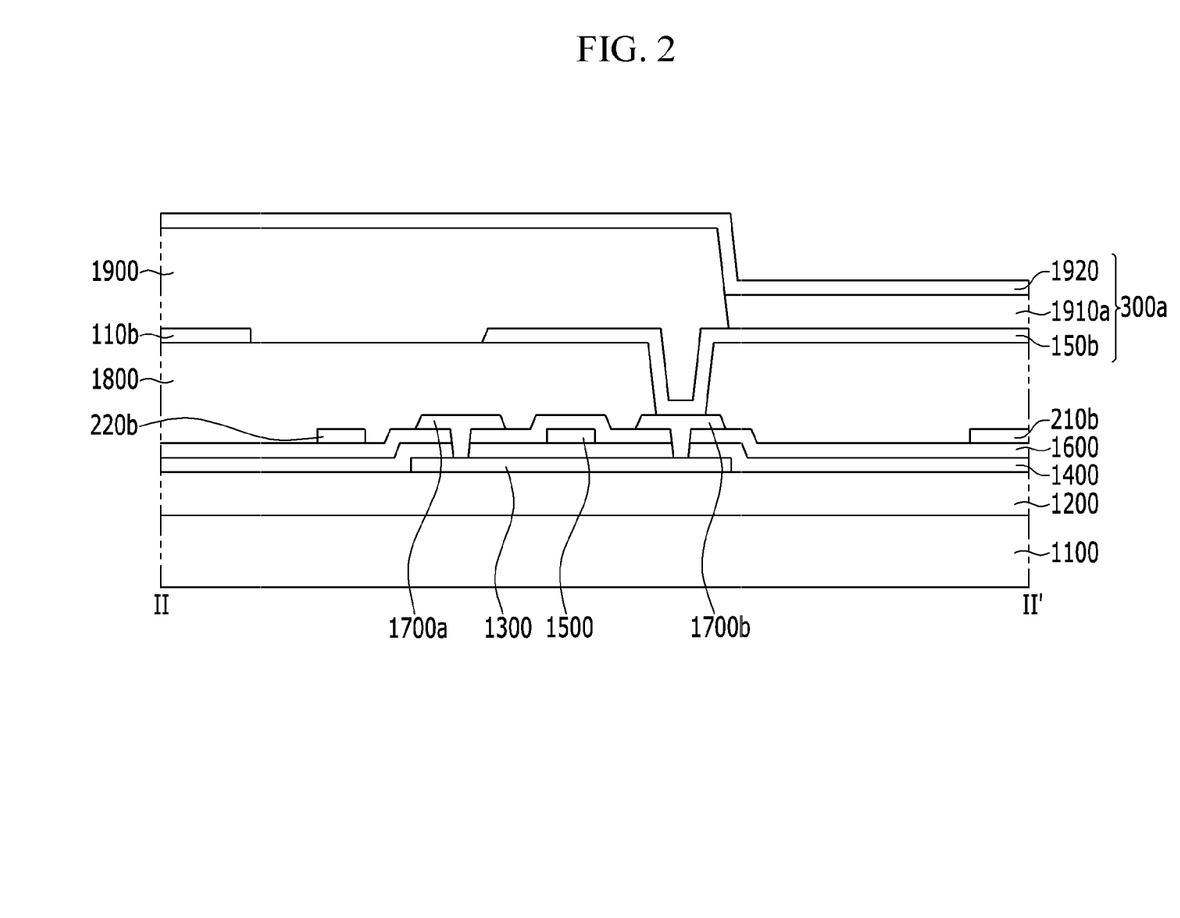
FIG. 2 is a cross-sectional view taken along a line II-II' of FIG. 1.
Figure 3:
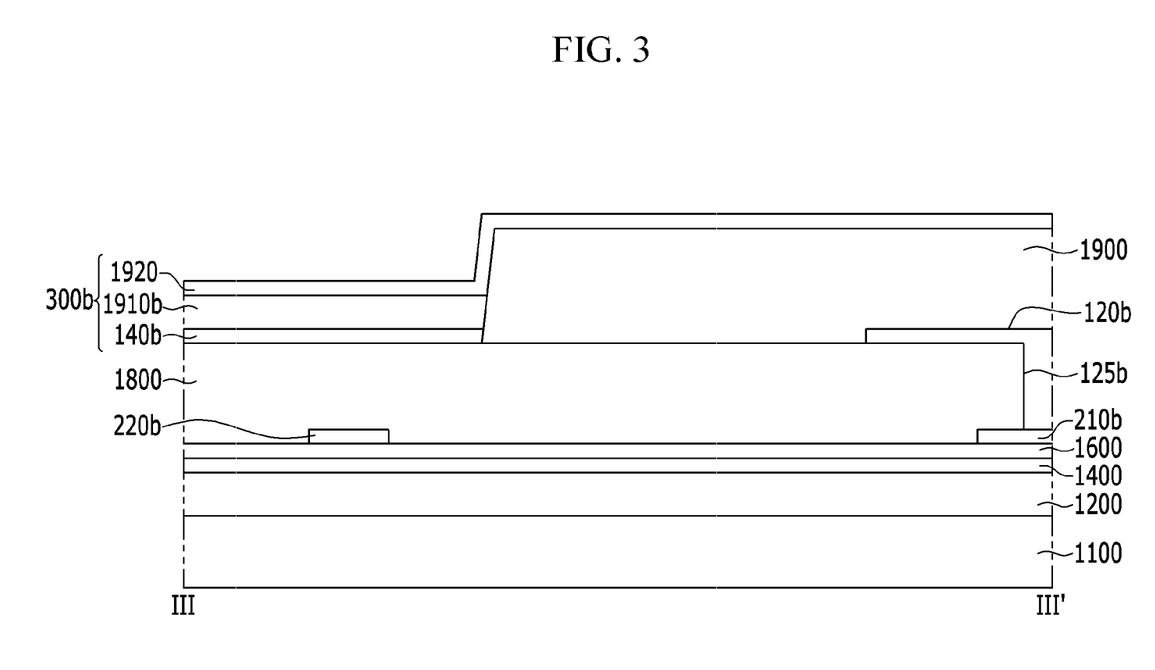
FIG. 3 is a cross-sectional view taken along a line III-III' of FIG. 1.
Figure 4:
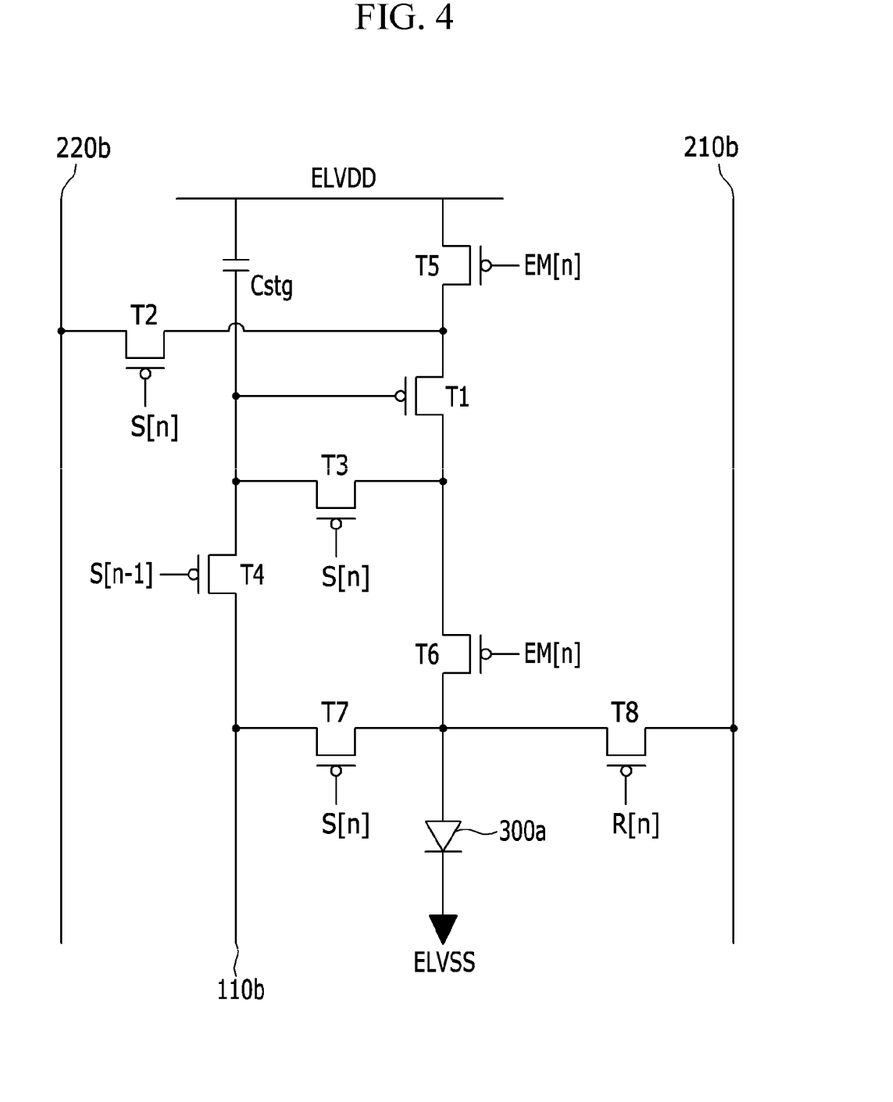
FIG. 4 is a circuit diagram of a pixel circuit according to an exemplary embodiment of the present inventive concept.

The cross-sections of FIGS. 2 and 3 and FIG. 4 correspond to one design exemplary embodiment to reflect a technical characteristic of the present inventive concept, and a person of ordinary skill in the art may differently design the structure for practice of the present inventive concept.

In FIGS. 2 and 3, only thin film transistor (TFT) and the organic light emitting elements 300a and 300b are shown and other layers such as encapsulation layers, the upper substrate, and the like are omitted.

An insulation substrate 1100 as a substrate in which a plurality of organic light emitting elements and the thin film transistors corresponding thereto are formed may be formed of glass or a plastic material such as a polyimide.

A buffer layer 1200 is disposed on the insulation substrate 1100. The buffer layer 1200 may be an inorganic material such as a silicon oxide (SiOx) and a silicon nitride (SiNx), and may be a single layer or a multilayer.

The buffer layer 1200 prevents impurities such as oxygen, moisture and the like from permeating into the TFT or the organic light emitting elements, and planarize the surface of the insulation substrate.

A semiconductor layer 1300 is disposed on the buffer layer 1200. The semiconductor layer 1300 may be polycrystalline silicon, and may form a channel region, a source region and a drain region.

The channel region may be polysilicon on which an impurity is not doped, that is, an intrinsic semiconductor, and the source region and the drain region may be formed at respective sides of the channel region and may be semiconductors in which impurities are doped.

A gate insulating layer 1400 is disposed on the semiconductor layer 1300. The gate insulating layer 1400 may be an inorganic material such as a silicon oxide (SiOx) and a silicon nitride (SiNx), and may be a single layer or a multilayer.

A gate electrode 1500 is disposed to correspond to the channel region of the semiconductor layer 1300, on the gate insulating layer 1400. The gate electrode 1500 may be a single layer or multilayer of conductive materials.

An interlayer insulating layer 1600 is disposed on the gate electrode 1500. The interlayer insulating layer 1600 may be an inorganic material such as a silicon oxide (SiOx) and a silicon nitride (SiNx), and may be a single layer or a multilayer.

Contact holes exposing the source region and the drain region of the semiconductor layer 1300, respectively, are formed in the interlayer insulating layer 1600 and the gate insulating layer 1400.

A source electrode 1700a connected with the source region through the contact hole and a drain electrode 1700b connected with the drain region through the contact hole are disposed on the interlayer insulating layer 1600.

The source electrode 1700a, the drain electrode 1700b, a data line 220b, and the second signal line 210b may be made of the same conductive material through the same process, and copper (Cu), aluminum (Al), molybdenum (Mo), chromium (Cr), titanium (Ti), and the like or alloys thereof may be formed in a single-layered or multilayered structure.

A first organic insulating layer 1800 is disposed on the source electrode 1700a and the drain electrode 1700b. The first organic insulating layer 1800 may be formed of an organic material such as a photoresist.

The first organic insulating layer 1800 includes the via hole exposing the drain electrode 1700b and the via hole 125b exposing the second signal line 210b. That is, when patterning the first organic insulating layer 1800, via holes of two kinds may be formed at one time, thereby omitting the separate mask.

Depending on whether the thin film transistor is a P type or an N type, a via hole exposing the source electrode 1700*a* rather than the drain electrode 1700*b* may be formed.

The first electrodes 130*a*, 130*b*, 130*c*, 140*a*, 140*b*, 140*c*, 150*a*, 150*b* and 150*c* of the organic light emitting elements 300*a* and 300*b*, the second sensing electrode expansion 120*a* and 120*b*, and the first signal line 110*a* and 110*b* are formed on the first organic insulating layer 1800.

Organic emission layers 1910*a* and 1910*b* and the second electrode 1920 are sequentially disposed on the first electrodes 140*b* and 150 to form the organic light emitting element 300*a* and 300*b*. The first electrodes 130*a*, 130*b*, 130*c*, 140*a*, 140*b*, 140*c*, 150*a*, 150*b* and 150*c* may be anodes, and the second electrode 1920 may be a cathode. Also, depending on the applied voltage, the arrangement of the anode and the cathode may be exchanged.

The first electrode 130*a*, 130*b*, 130*c*, 140*a*, 140*b*, 140*c*, 150*a*, 150*b* and 150*c*, the second sensing electrode expansion 120*a* and 120*b*, and the first signal line 110*a* and 110*b* may be formed by patterning the first metal layer 100 of the same material, and the first metal layer 100 may be made of a transparent conductive material such as indium tin oxide (ITO), indium zinc oxide (IZO), zinc oxide (ZnO), or indium oxide (In2O3), or a reflective metal such as lithium (Li), calcium (Ca), lithium fluoride/calcium (LiF/Ca), lithium fluoride/aluminum (LiF/Al), aluminum (Al), silver (Ag), magnesium (Mg), or gold (Au).

A second organic insulating layer 1900 surrounds an edge of the first electrodes 130*a*, 130*b*, 130*c*, 140*a*, 140*b*, 140*c*, 150*a*, 150*b* and 150*c* and is disposed on the first organic insulating layer 1800. The second organic insulating layer 1900 is called a pixel defining layer, and partitions a light emission area of the organic light emitting element.

The second organic insulating layer 1900 may be formed by a resin such as polyacrylates or polyimides.

The organic emission layers 1910*a* and 1910*b* are formed on the first electrodes 130*a*, 130*b*, 130*c*, 140*a*, 140*b*, 140*c*, 150*a*, 150*b* and 150*c* which is the light emission area partitioned by the second organic insulating layer 1900.

The organic emission layers 1910*a* and 1910*b* may be configured as single layers or a multiple layers including one or more of an emission layer, a hole-injection layer (HIL), a hole-transporting layer (HTL), an electron-transporting layer (ETL), and an electron-injection layer (EIL).

In the case where the organic emission layer 1910*a* and 1910*b* includes all the layers, the HIL is positioned on the first electrodes 130*a*, 130*b*, 130*c*, 140*a*, 140*b*, 140*c*, 150*a*, 150*b* and 150*c*, and the HTL, the emission layer, the ETL, and the EIL may be sequentially stacked thereon.

The organic emission layers 1910*a* and 1910*b* may include a red organic emission layer emitting red light, a green organic emission layer emitting green light, and a blue organic emission layer emitting blue light. The red organic emission layer, the green organic emission layer, and the blue organic emission layer are formed in a red pixel, a green pixel, and a blue pixel, respectively, thereby displaying a color image.

Further, in the organic emission layers 1910*a* and 1910*b*, all of the red organic emission layer, the green organic emission layer, and the blue organic emission layer are stacked together on the red pixel, the green pixel, and the blue pixel, and a red color filter, a green color filter, and a blue color filter are formed for each pixel, thereby displaying a color image. As another example, white organic emission layers emitting white light are formed on all of the red pixel, the green pixel, and the blue pixel, and a red color filter, a green color filter, and a blue color filter are formed for each pixel, thereby displaying the color image. In the case of displaying the color image by using the white organic emission layer and the color filters, it is not required to use a deposition mask for depositing the red organic emission layer, the green organic emission layer, and the blue organic emission layer on respective pixels, that is, the red pixel, the green pixel, and the blue pixel.

The white organic emission layer described in another example may be formed by one organic emission layer, and also includes a configuration formed so as to emit white light by stacking a plurality of organic emission layers. For example, the white organic emission layer may include a configuration which may emit white light by combining at least one yellow organic emission layer and at least one blue organic emission layer, a configuration which may emit white light by combining at least one cyan organic emission layer and at least one red organic emission layer, a configuration which may emit white light by combining at least one magenta organic emission layer and at least one green organic emission layer, and the like.

The second electrode 1920 is disposed on the second organic insulating layer 1900 and the organic emission layer 1910*a* and 1910*b*. The cathode 1920 may be made of a transparent conductive material such as ITO, IZO, ZnO, or In2O3, or a reflective metal such as lithium, calcium, lithium fluoride/calcium, lithium fluoride/aluminum, aluminum, silver, magnesium, or gold.

FIG. 4 is a circuit diagram of a pixel circuit according to an exemplary embodiment of the present inventive concept.

The circuit diagram of FIG. 4 is just an example, and a person of ordinary skill in the art may practice the present inventive concept by using the circuit diagram of various pixel circuits.

FIG. 4 will be described based on the pixel circuit emitting the organic light emitting element 300*a*. Referring to FIG. 2, the transistor shown to be connected to the first electrode 150*b* in FIG. 2 may be one among the sixth, the seventh, and the eighth transistors T6, T7, and T8.

Referring to FIG. 4, the data line 220*b* is connected to one end of the switching transistor T2, and the other end of the switching transistor T2 is connected to a node between the driving transistor T1 and the fifth transistor T5.

The control terminal of the switching transistor T2 is connected to the scanning signal line S[n].

One end of the driving transistor T1 is connected to the other end of the switching transistor T2 and the fifth transistor T5, and the other end thereof is connected to a node of the third transistor T3 and the sixth transistor T6.

The control terminal of the fifth transistor T5 is connected to a light emission control line EM[n], and the control terminal of the driving transistor T1 is connected to one end of a storage capacitor Cstg.

The other end of the storage capacitor Cstg and the other end of the fifth transistor T5 are connected to the first power source ELVDD.

The control terminal of the driving transistor T1 is connected to the other end of the third transistor T3, and one end of the fourth transistor T4 is connected to the same node.

The seventh transistor T7 has one end connected to the other end of the fourth transistor T4, and the other end connected to the other end of the sixth transistor T6 and the first electrode 150*b* of the organic light emitting element 300*a*. The first signal line 110*b* is connected to the node of the fourth transistor T4 and the seventh transistor T7.

The scanning signal line S[n] is connected to the control terminal of the third transistor T3 and the seventh transistor T7, and the previous scanning signal line S[n−1] is connected to the control terminal of the fourth transistor T4. The light emission control line EM[n] is connected to the control terminal of the sixth transistor T6.

One end of the eighth transistor T8 is connected to the first electrode 150b of the organic light emitting element 300a, and the other end thereof is connected to the second signal line 210b.

In the present exemplary embodiment, the first signal line 110b corresponds to the initialization voltage supply line, however in another exemplary embodiment, it may correspond to another control signal line extending in the first direction x.

Accordingly, the first signal line 110b supplies the initialization voltage VINIT to each pixel circuit in the display mode. In general, the initialization voltage VINIT is a DC voltage.

In the present exemplary embodiment, the second signal line 210b corresponds to a readout line.

In the display mode, the first signal line 110b supplies the initialization voltage VINIT, and in the readout mode, the second signal line 210b receives the voltage of the partial node of the pixel circuit, which is the voltage of the first electrode 150b.

In the touch mode, the first signal line 110b supplies the touch driving signal, and the second signal line 210b receives the touch detecting signal. Accordingly, the touch of the user may be determined depending on the mutual capacitance change.

However, part of the first signal lines 110b and the second signal lines 210b may be used as the Tx electrode and the Rx electrode in the touch mode. The number of the first signal lines 110b and the second signal lines 210b used for touch sensing may be determined according to the required resolution of the touch sensor.

In another exemplary embodiment, the second signal line 210b may correspond to other control signal line extending in a second direction y. Particularly, in the display device structure in which the readout line does not exist, the data line 220b may play a role of the second signal line 210b of the present inventive concept. In the display device structure, without the readout mode, one mode of the display mode and the touch mode is driven by the time division manner.

In this case, in the display mode, the first signal line 110b supplies the initialization voltage VINIT, and the second signal line 210b supplies the data voltage. Also, in the touch mode, the first signal line 110b supplies the touch driving signal, and the second signal line 210b receives the touch detecting signal.

The eighth transistor T8 is operated in the readout mode and is not generally operated in the touch mode or the display mode. The eighth transistor T8 is turned on in the readout mode to sense the voltage or the current of the first electrode 150b by the second signal line 210b.

The operation of the pixel circuit of FIG. 4 will be described.

Firstly, if the voltage of an ON level is applied to the previous scanning signal line S[n−1], the fourth transistor T4 is turned on and the initialization voltage VINIT is applied to one end of the storage capacitor Cstg.

Accordingly, the storage capacitor Cstg is initialized with a voltage difference of the first power source ELVDD and the VINIT. In this case, the described voltage difference is the magnitude that exceeds a threshold voltage of the driving transistor T1, thereby the driving transistor T1 is turned on.

In this case, the light emission control line EM[n] and the scanning signal line S[n] are applied with the voltage of the OFF level.

Next, the previous scanning signal line S[n−1] is applied with the voltage of the OFF level such that the fourth transistor T4 is turned off, and the scanning signal line S[n] is applied with the voltage of the ON level such that the switching transistor T2, the third transistor T3, and the seventh transistor T7 are turned on.

In this case, the control terminal and the drain terminal of the driving transistor T1 are connected in the same node by the third transistor T3, thereby forming a diode state.

The data voltage supplied from the data line 220b is written to the storage capacitor Cstg via the second transistor T2, the driving transistor T1, and the third transistor T3.

In this case, since the driving transistor T1 is in the diode state, the voltage that is decreased by the threshold voltage of the driving transistor T1 is written to the storage capacitor Cstg. That is, the threshold voltage compensation of the driving transistor T1 is also performed.

In this case, the light emission control line EM[n] is applied with the OFF-level voltage.

If the writing of the data voltage is finished, the previous scanning signal line S[n−1] and the scanning signal line S[n] are applied with the voltage of the OFF level, and the light emission control line EM[n] is applied with the voltage of the ON level.

Accordingly, the degree of the conductivity of the driving transistor T1 is determined depending on the voltage amount written to the storage capacitor Cstg such that the organic light emitting element 300a is emitted by the corresponding gray.

Figure 5:
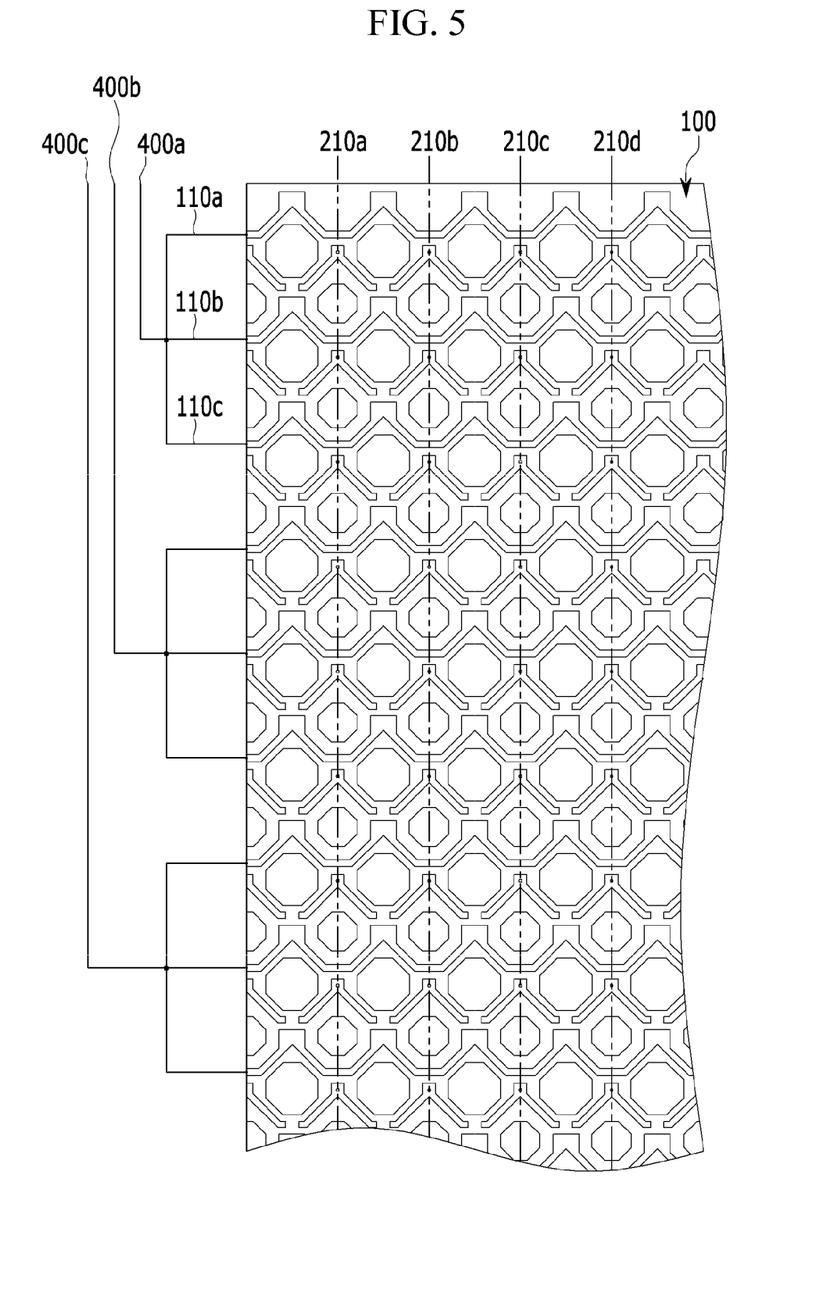
FIG. 5 is a view to explain peripheral wiring according to an exemplary embodiment of the present inventive concept.

FIG. 5 is a view to explain peripheral wiring according to an exemplary embodiment of the present inventive concept.

Wirings 210a, 210b, 210c, 210d, 400a, 400b, and 400c extending outside the first metal layer 100 shown in FIG. 5 are the wirings only related to the driving of the touch mode in the present exemplary embodiment. It is apparent to a person of ordinary skill in the art that other wirings such as power source lines and signal lines may be included in the peripheral wirings.

As described above, there is no problem if the resolution of the touch electrodes to sense the touch of a finger is lower than the resolution of the pixel.

Accordingly, in the exemplary embodiment shown in FIG. 5, a plurality of first signal lines 110a, 110b, and 110c are grouped to form the peripheral wiring 400a. Other peripheral wirings 400b and 400c may be formed by the same method.

In FIG. 5, three first signal lines 110a, 110b, and 110c form one group, however one group may be formed by a different number of the first signal lines depending on the touch resolution, and this is apparent to a person of ordinary skill in the art. In this case, the first signal lines 110a, 110b, and 110c are physically grouped, thereby forming one peripheral wiring 400a.

Also, the peripheral wiring 400a, 400b, and 400c supply the initialization voltage VINIT in the display mode, since the initialization voltage may be the same DC voltage, the display mode may be driven by the above-described configuration.

In FIG. 5, although the plurality of second signal lines 210a, 210b, 210c, and 210d are depicted as respectively constituting the peripheral wiring, other grouping is possible depending on the touch resolution.

That is, each of the second signal lines 210a, 210b, 210c, and 210d may be connected to the respective IC pad and the pixel, and the plurality of second signal lines 210a, 210b, 210c, and 210d may be grouped depending on the touch resolution and may be connected to one IC pad.

However, when grouping the second signal lines 210a, 210b, 210c, and 210d, in the readout mode, to detect the degradation or the distribution of the organic light emitting element in each pixel, it is preferable that a demultiplexer is provided thereon to selectively perform readout.

The accompanying drawings and the detailed description of the present inventive concept are merely examples of the present inventive concept. Further, these are only used for describing the present inventive concept, and are not intended to restrict the meaning or limit the scope of the present inventive concept described in the appended claims. Accordingly, it should be understood by those skilled in the art that various modifications and equivalents to these embodiments are possible. Therefore, it is to be appreciated that the technical scope of the present inventive concept is determined only by the appended claims.

What is claimed is:

1. A touch display device comprising:
a plurality of pixel circuits, each of the plurality of pixel circuits including an organic light emitting element;
a plurality of first signal lines respectively connected to the plurality of pixel circuits and extending in a first direction; and
a plurality of second signal lines and a plurality of data lines respectively connected to the plurality of pixel circuits and extending in a second direction,
wherein at least one signal line among the plurality of first signal lines function as a first sensing electrode and at least one signal line among the plurality of second signal lines function as a second sensing electrode in a touch mode, and
wherein the touch display device is driven with time division mode which includes a display mode, a readout mode and the touch mode, the plurality of first signal lines supply an initialization voltage in the display mode, the plurality of second signal lines receive a voltage of at least one node of a pixel circuit in the readout mode, at least one signal line among the plurality of first signal lines supply a touch driving signal in the touch mode, and at least one signal line among the plurality of second signal lines receive a touch detecting signal in the touch mode.

2. The touch display device of claim 1, wherein the plurality of first signal lines are grouped in a predetermined number to form peripheral wiring.

3. A touch display device comprising:
a plurality of pixel circuits, the pixel circuits including a scanning signal line and a data line crossing the scanning signal line;
a plurality of first signal lines respectively connected to the plurality of pixel circuits and substantially extending in a first direction;
a plurality of second signal lines respectively connected to the plurality of pixel circuits and extending in a second direction; and
a plurality of second sensing electrode expansions disposed between adjacent first signal lines of the plurality of first signal lines,
wherein the plurality of second sensing electrode extensions and the plurality of second signal lines are disposed on different layers, are connected to each other and cross each other in a plan view, and
wherein the plurality of first signal lines are initialization voltage supply lines and the plurality of second signal lines are readout wirings.

4. The touch display device of claim 3, wherein the plurality of second sensing electrode expansions and the plurality of first signal lines are formed of a same material through a same process.

5. The touch display device of claim 4, wherein the plurality of second sensing electrode expansions are formed in a region corresponding to green pixels, respectively.

6. The touch display device of claim 3, wherein at least one of the plurality of pixel circuits includes an organic light emitting element, the organic light emitting element includes a first electrode, a second electrode and an organic emission layer disposed between the first electrode and the second electrode, and
wherein the first electrode and the plurality of second sensing electrode expansions are formed of a same material through a same process.

7. The touch display device of claim 6, wherein the plurality of second sensing electrode expansions are formed in a region corresponding to green pixels, respectively.

8. The touch display device of claim 3, wherein the plurality of second sensing electrode expansions are formed in a region corresponding to green pixels, respectively.

* * * * *